June 19, 1934.  J. F. GEYER  1,963,621
CUP DISPENSING MECHANISM
Filed Jan. 13, 1932  5 Sheets-Sheet 1
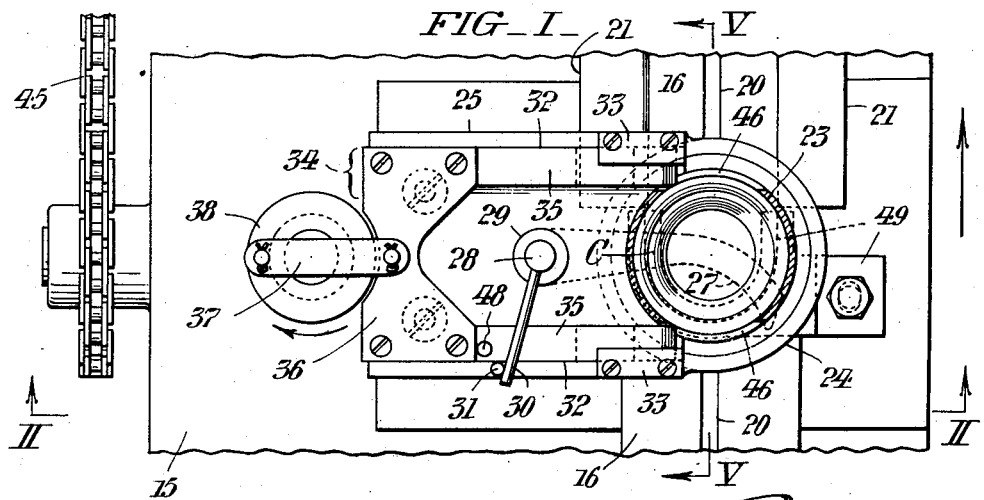
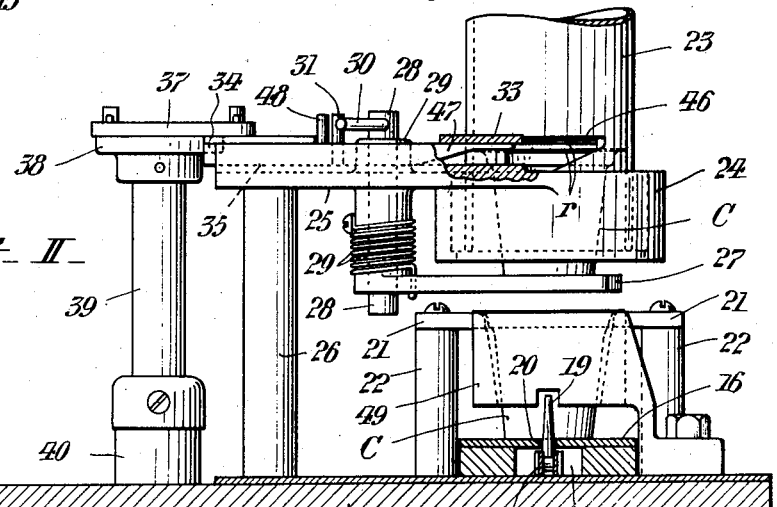
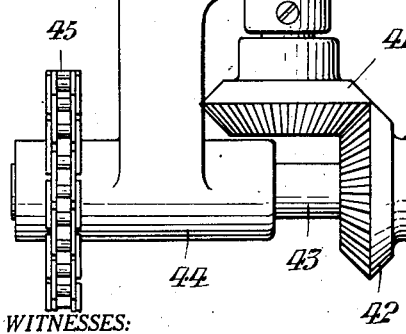
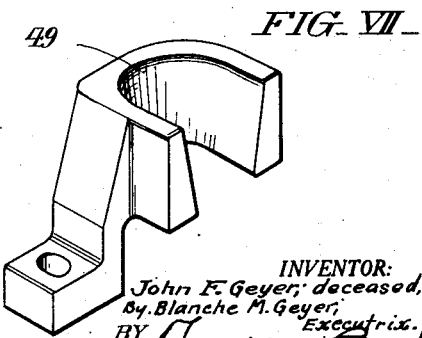
WITNESSES:
INVENTOR:
John F. Geyer, deceased,
By. Blanche M. Geyer,
Executrix.
BY
ATTORNEYS.

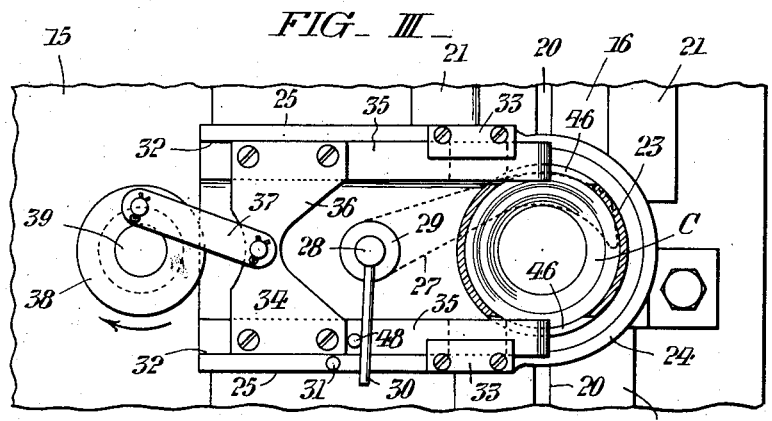
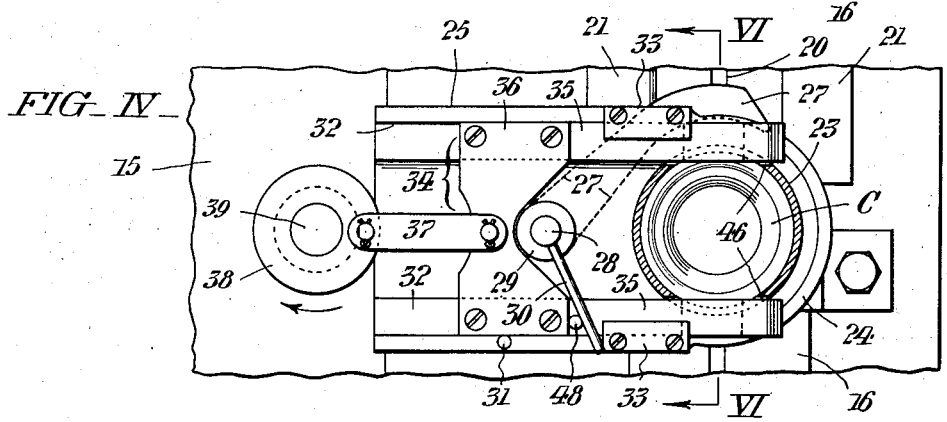
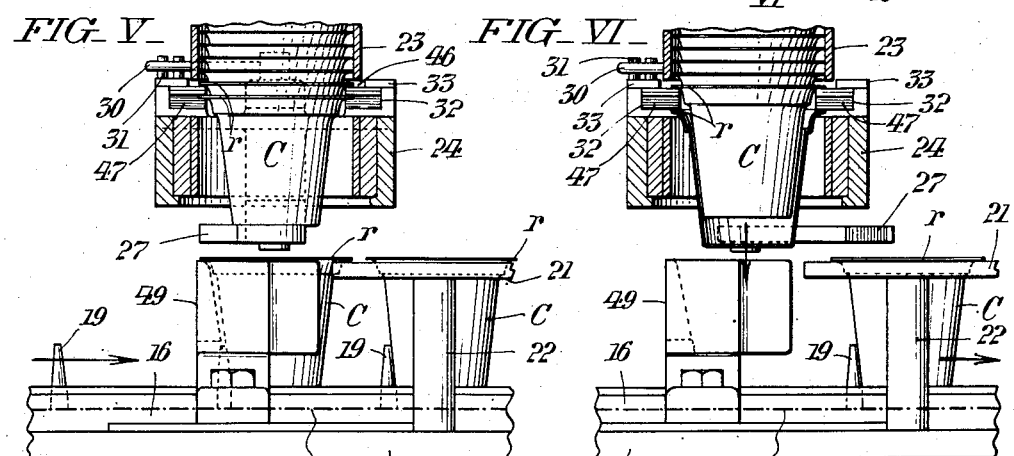

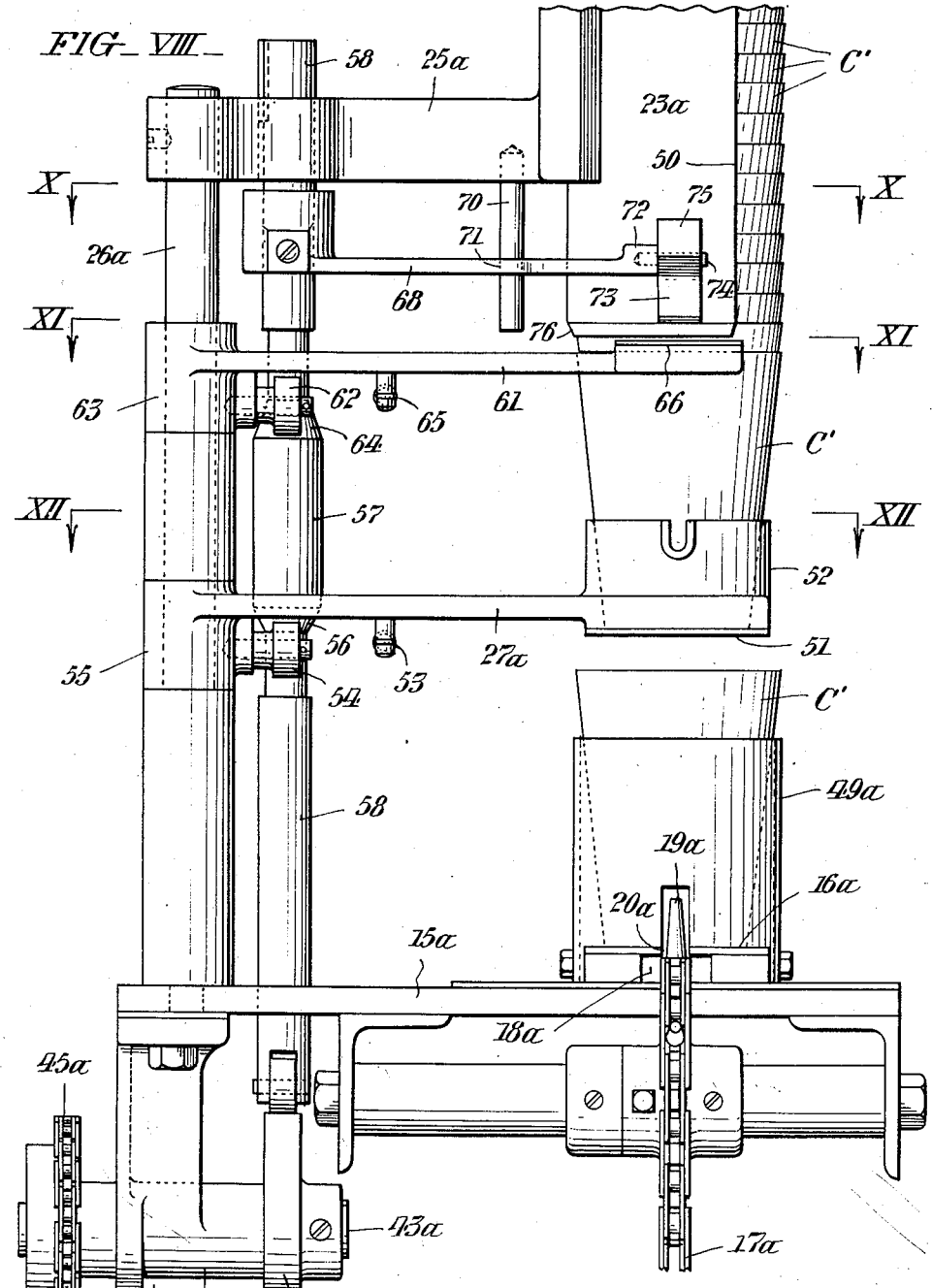

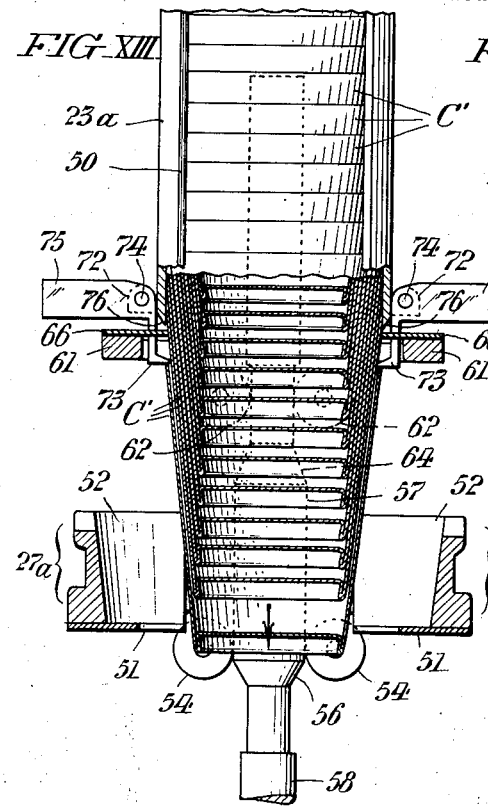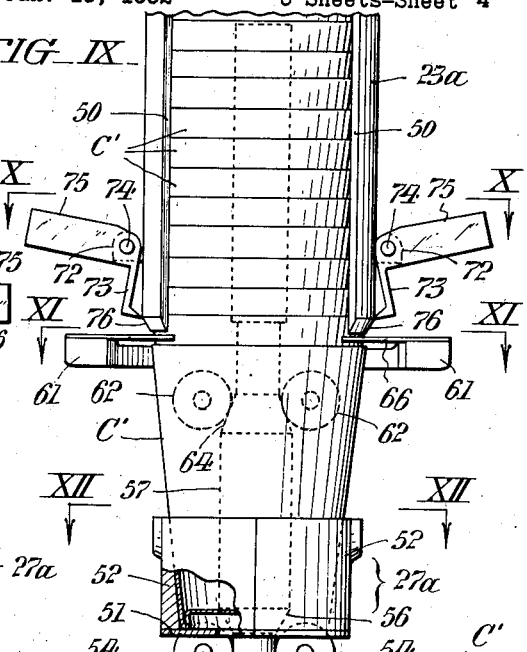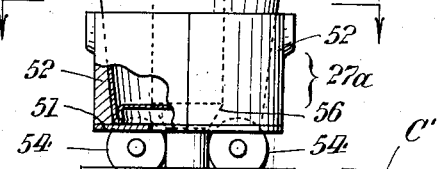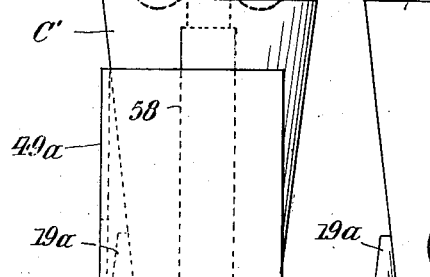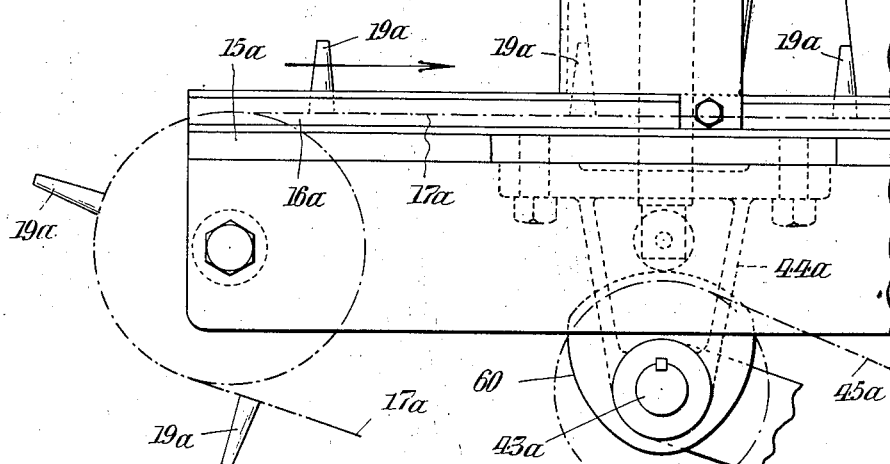

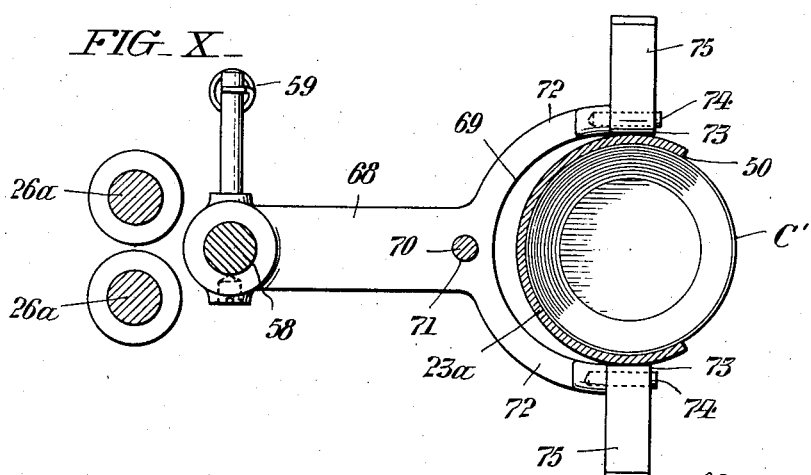
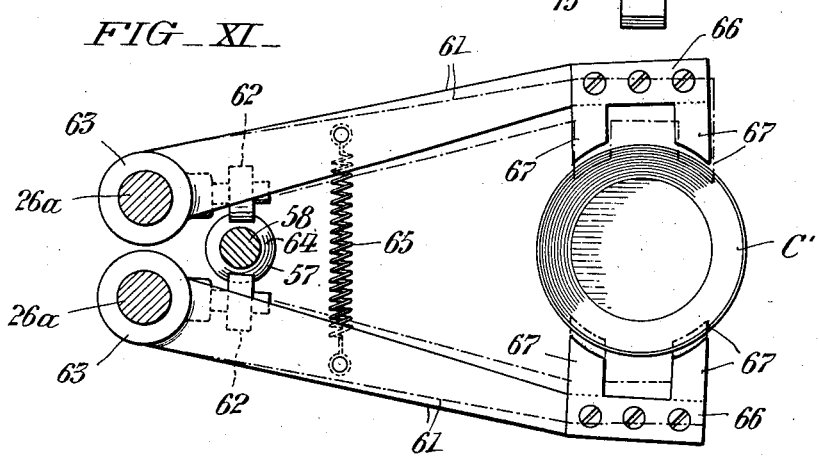
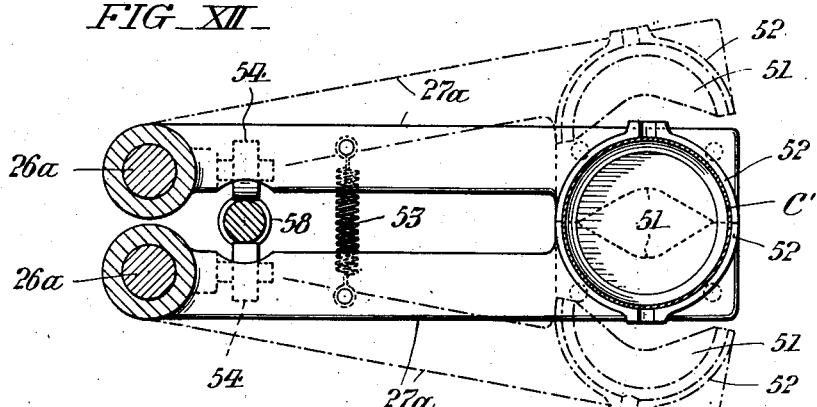

Patented June 19, 1934

1,963,621

UNITED STATES PATENT OFFICE 1,963,621

CUP DISPENSING MECHANISM

John F. Geyer, deceased, late of Willow Grove, Pa., by Blanche M. Geyer, Willow Grove, Pa., executrix, assignor to The Filler Machine Company, Incorporated, Philadelphia, Pa., a corporation of Pennsylvania Application January 13, 1932, Serial No. 586,273

6 Claims. (Cl. 312—44)

This invention relates to mechanism intended for incorporation in filling machines, to dispense cups of paper or the like which are to be filled, for example, with ice cream.

In filling machines of the kind to which reference is made, the cups are progressed, by a conveying means, along a horizontal table, and successively presented at a station where they are filled with the ice cream.

Broadly speaking, the present invention is directed toward the provision of a simple, compact, reliable and automatically operative dispensing mechanism capable of releasing cups, with positiveness, one at a time, from a stack in a vertical storage magazine to drop onto the table of the filling machine in the path of the conveying means for progression in definite succession to the filling mechanism.

In connection with mechanism for dispensing tapered, rim-topped cups, it is an object of this invention to provide a retractable member for normally supporting a stack of the cups in a vertical magazine, and wedge means for engaging between the rims of the lowermost and the immediately superjacent cups in the supply stack to sustain the stack incident to retraction of the supporting member, and, at the same time, to pry loose or strip the lowermost cup so that it may drop from the magazine onto the table of the filling machine.

In connection with mechanism for dispensing plain tapered cups, it is a further object of this invention to provide, in addition to a retractable member for normally supporting a stack of such cups in a vertical magazine, means for clampingly engaging the cup immediately superjacent the lowermost cup in the stack thereby to sustain the stack incident to retraction of the supporting member aforesaid, and stripper means for engaging the top edge of the lowermost cup to dislodge the said cup and to release it from the magazine.

Other objects and attendant advantages of this invention will be manifest from the detailed description following of the attached drawings, wherein Fig. I is a partial plan view of a filling machine fitted with the improved mechanism in a form suitable for dispensing cups with top rims or flanges.

Fig. II is a transverse sectional view taken as indicated by the arrows II—II in Fig. I.

Figs. III and IV are views corresponding to Fig. I showing the movable parts of the mechanism in the positions which they assume incident to releasing a cup from the supply magazine.

Figs. V and VI are fragmentary detail sectional views taken as indicated by the arrows V—V and VI—VI respectively in Figs. I and IV.

Fig. VII is a perspective view of a cup guide means forming a part of the mechanism.

Fig. VIII is an end elevation of a filling machine showing the improved mechanism arranged for dispensing plain tapered cups devoid of top rims.

Fig. IX is a fragmentary front view of the organization shown in Fig. VIII.

Figs. X, XI and XII are horizontal sections taken respectively as indicated by the arrows X—X, XI—XI and XII—XII in Figs. VIII and IX; and Fig. XIII is a view, partly in front elevation and partly in section, showing the movable parts of the form of dispensing mechanism of Figs. VIII—XII in different positions incident to release of one of the cups.

With more detailed reference first to the embodiment of this invention shown in Figs. I-VII of these illustrations, the numeral 15 designates the horizontal table of the filling machine, which table has mounted thereon a track 16 wherealong the cups C are progressed by a sprocket conveyor chain 17 in the direction indicated by the arrows in Figs. I, V and VI. As shown in Fig. II, the conveyor chain 17 moves through a longitudinal hollow 18 of the track 16, and is provided at intervals, with pins 19 which project upwardly through a central slot 20 in the said track, to engage the individual cups C. A pair of spaced guide strips 21 supported by posts 22 upstanding from the table 15 and extending along the track 16, engage the cups C at opposite sides immediately below their top rims r, and thus operate to keep the cups centralized on the track incident to being progressed by the conveyor chain 17.

The form of dispensing mechanism shown in Figs. I-VII and with which the present invention is more especially concerned, comprises a vertical tubular magazine 23 capable of accommodating a multiplicity of the cups C in inter-engaged relation with bottoms downward as shown in Figs. V and VI, the said magazine being supported centrally over the track 16, within a boss 24 of a fixed horizontal bracket 25 which overreaches the track from an anchorage post 26 fixed in the table 15. Normally, the stack of the cups C is supported by a retractable member in the form of a finger 27 whereon the lowermost cup rests, as shown in Fig. II, which finger 27 is secured to a vertical axis 28 rotatively journalled in a central bearing boss 29 of the bracket 25 so as to be swingable horizontally beneath the magazine 23. A coiled spring 29 tends to rotate the vertical axis 28 clockwise in Fig. I and thus maintains an actuating arm 30 at the top of said shaft yieldingly in engagement with a fixed stop pin 31 at one side of the bracket 25, with the finger 27 normally positioned crosswise of the bottom of the cup magazine as shown.

Guided in suitable ways 32 afforded by the bracket 25 and held to said guideways by means of cap plates 33, is a slide 34 affording a pair of spaced stripper fingers 35 which are connected at their rear ends by a cross piece 36. Reciprocatory movement is imparted to the slide 34 by virtue of an interposed link connection 37 with a crank disk 38 at the top end of a vertical shaft 39 which extends down through a bearing 40 on the table 15. At its lower end the shaft 39 carries a miter gear pinion 41 that meshes with a companion miter pinion 42 on a horizontal shaft 43. This horizontal shaft 43 has journal support in a drop bracket 44 bolted or otherwise secured to the underside of the table 15, and receives motion, through a sprocket chain connection 45, from the drive mechanism (not shown) of the filling machine. The tubular magazine 23 is provided at its opposite sides with horizontal slots 46, see Figs. I and II, which permit penetration of the magazine by the stripper fingers 35 of the slide 34 when the latter is moved in the direction of the magazine. From Fig. II it will be particularly noted that the forward ends of the stripper fingers 35 of the slide 34 are tapered as at 47 for wedging action between the top rims r of the lowermost and the immediately superjacent cups in the stack within the magazine 23, so as to pry loose the bottom cup and to release it from the magazine in a manner more fully set forth later. In order to actuate the cup stack supporting finger 27, that is to say, to move it from the position of Fig. I through the position of Fig. III to the position of Fig. IV, incident to release of a cup C from the magazine, the slide 34 is fitted with an upstanding projection 48 adapted to engage the arm 30 of the fulcrum axis 28 for said finger.

As a means to control the cups upon being released from the magazine 23 and to prevent them from toppling over as they drop on to the track 16, the machine is provided with a guide block 49 which is bolted fast, with provision for adjustment, to the top of the table 15 in the region of the magazine. As shown in Figs. I and VII, this guide block 49 is U-shaped in plan and open in the direction of travel of the conveyor chain 17, its throat being tapered to correspond to the configuration of the cups.

The operation of the mechanism of Figs. I-VI is as follows:—As the slide 34 moves forward toward the magazine 23 its stripper fingers 35 advance beneath the top rim r of the second lowermost cup in the stack within the magazine 23 in readiness to sustain the stack as the supporting finger 27 is being concurrently withdrawn to the position shown in Fig. IV by action of the projection 48 on said slide upon the actuating arm 30 on the vertical fulcrum axis of said supporting finger. As the forward movement of the slide 34 continues, the tapered portions 47 of the stripper fingers 35 by wedging action between the top rims r of the lowermost and the immediately superjacent cups C in the stack within the magazine 23, pry the lowermost cup loose from its immediate neighbor as shown in Fig. VI. This action, it will be noted from Figs. IV and VI is consummated just as the supporting finger 27 reaches the outer limit of its swinging movement. The dislodged cup C being thus released, drops onto the track 16 into the path of one of the pins 19 of the conveyor chain 17 for progression along the table 15. During its fall, the cup is braced by the guide block 49 and thereby prevented from toppling over as well as from fouling the pin 19 of the conveyor chain 17 previously advanced into position to progress the cup—all in a manner which will be readily understood from Figs. V and VI. While moving along the table 15, the cups are held to upright position by the sustaining action of the guide strips 21 upon their top rims r as already understood. After release of the cup, the movable parts of the mechanism are returned to their normal positions as the shaft 39 completes its rotation, in readiness to repeat the described cycle.

In the form of dispensing mechanism shown in Figs. VIII—XIII, the magazine 23a is supported centrally over the track 16a on the table 15a of the filling machine by a horizontal bracket arm 25a which is secured to the tops of a pair of posts 26a upstanding from said table. As shown, the magazine 23a is cut away at the front as at 50 to facilitate insertion of the cups C', which, in this instance, are tapered but plain, that is to say, without top rims. Normally, the stack of the cups C' is supported on the bottom stop plates 51 of a split receiver 52 jointly afforded by a pair of arms 27a which are fulcrumed for horizontal swinging movement on the posts 26a and yieldingly drawn toward each other by a tension spring 53 connecting them transversely. To release the lowermost cup C' in the stack within the magazine 23a, the arms 27a are adapted to be spread apart through cooperation between rollers 54 on their fulcrum bosses 55, and the lower wedge cam taper 56 of an enlargement 57 on a vertically reciprocative rod 58. This rod 58 has sliding guidance at its upper end in the bracket 25a and at its lower end in the table 15a, and is subject to the downward pull of a spring shown at 59 in Fig. X. Reciprocatory movement is imparted to the cam rod 58 by a rotary cam 60 on a horizontal shaft 43a which is journalled in a fixed bearing bracket 44a and rotated, through a sprocket chain connection 45a, from the drive mechanism (not illustrated) of the filling machine. Also fulcrumed on the posts 26a at a level above the arms 27a, is another pair of arms 61 with rollers 62 on their fulcrum bosses 63 adapted to be acted upon by the upper wedge cam taper 64 of the enlargement 57 of the vertically reciprocative rod 58. A transverse connecting spring 65 yieldingly resists spreading of the arms 61 by the cam enlargement 57 on the rod 58, the said arms being fitted at their free ends with plates 66 affording inward gripping or clamp fingers 67 for engaging the cups C from opposite sides for a purpose presently explained. Secured to the cam rod 58 near its upper end and immediately below the bracket 25a, is an arm 68 whereof the outer end is bifurcated as at 69 in Fig. X to span the lower end of the magazine 23a. A pin 70 depending from the bracket 25a and engaging an aperture 71 in the arm 68, serves to confine the said arm to vertical movement and also to prevent rotation of the vertical rod 58 in the table 15a and in the bracket 25a. As shown in Figs. VIII, IX and X and XIII the extremities 72 of the bifurcated arm 68 carry hook-like stripper fingers 73 which are pivotally supported by pins 74 reaching forwardly from the ends of the aforesaid extremities, and which are counterweighted as at 75. Thus the hook ends of the strippers 73 are yieldingly urged inwards towards each other and normally engage the magazine 23a from opposite sides as shown in Fig. IX.

In the operation of the last described type of dispensing mechanism, as the rod 58 descends from the position shown in Figs. VIII and IX, the lower cam taper 56 of its enlargement 57, by cooperation with the rollers 54, causes spreading of the arms 27a to the position indicated in dot and dash lines in Fig. XII against the pull of the spring 53 with attendant removal of the plates 51 from beneath the lowermost cup C' in the stack within the magazine 23a. Concurrently with the events just related and as the upper cam slope 64 of the enlargement on the rod 58 recedes downwardly away from the cooperating rollers 62 the spring 65 is permitted to draw the two companion clamp arms 61 inward toward each other from the normal position shown in full lines in Fig. XI to the dot and dash line position. As a result, the fingers 67 on said arms clamp the cup C' immediately above the lowermost one in the stack within the magazine to temporarily sustain the stack, the arms thus performing a function analogous to that performed by the slide 34 of the first described embodiment of this invention. Also attendant upon descent of the rod 58, the hook projections of the strippers 73 slide downward along the surface of the magazine 23a. Upon passing below the lower edge of the magazine the hook projections of the strippers 73 swing inward and as the downward movement of the rod continues the said strippers pass between the fingers 67 of the clamp arms 59 and engage the top edge of the now suspended lowermost cup C' of the stack and strip it from the superjacent cup of the stack as shown in Fig. XIII, the latter cup being at this time held by the aforesaid clamp fingers as already explained and as shown in Fig. XIII. The released cup C' thereupon falls onto the table 15a ahead of one of the pins 19a on the conveyor chain 17a, it being guided in its fall by the fixed guide member 49a, in a manner which will be readily understood from Figs. VIII and IX, and thus prevented from toppling over, the said guide member being generally similar to the guide member 49 of the first described embodiment. Immediately upon release of the cup, the various movable parts of the mechanism return to the normal positions illustrated in full lines in Figs. VII-XII as the cam rod 58 rises in readiness to dispense the next cup. During the restorative phase of the operating cycle, the bevel 76 around the bottom edge of the magazine operates after the manner of a cam to progressively swing the strippers outward to their normal positions.

The invention having thus been described, claims are made as follows:

1. In cup dispensing mechanism, a magazine accommodating a stack of inter-engaged, tapered cups with their bottoms downward; a member movable across the bottom of the magazine to normally support the stack of cups, and an independently movable member to sustain the stack incident to retraction of the supporting member aforesaid and to concurrently strip the lowermost cup from the stack for release to drop from the magazine.

2. In cup dispensing mechanism, a magazine accommodating a stack of inter-engaged, top rimmed, tapered cups with their bottoms downward; a member movable across the bottom of the magazine to normally support the stack of cups; and an independently-actuated wedge means operative incident to retraction of the supporting member aforesaid, to engage between the top rims of the lowermost cup and the immediately superjacent cup in the stack thereby to temporarily sustain the stack and to dislodge the lowermost cup for release to drop from the magazine.

3. In cup dispensing mechanism, a magazine accommodating a stack of inter-engaged, top rimmed, tapered cups with their bottoms downward; a pivoted member swingable horizontally crosswise of the bottom of the magazine to normally support the stack of cups; and a horizontal slide with wedge fingers operative, incident to retraction of the aforesaid pivoted member, to engage between the top rims of the lowermost cup and the immediately superjacent cup of the stack, thereby to sustain the stack with attendant dislodgment of the lowermost cup for release to drop from the magazine.

4. In cup dispensing mechanism, a magazine accommodating a stack of inter-engaged, top rimmed, tapered cups with their bottoms downward; a pivoted member swingable horizontally crosswise of the bottom of the magazine to normally support the stack of cups; a slide with wedge fingers operative incident to retraction of the aforesaid pivoted member to engage between the top rims of the lowermost cup and the immediately superjacent cup of the stack at opposite sides, thereby to sustain the stack with attendant dislodgment of the lowermost cup for release to drop from the magazine; means to reciprocate the slide; and connections whereby the aforesaid pivoted member is operated by the slide.

5. In cup dispensing mechanism, a magazine accommodating a stack of inter-engaged, top-rimmed, tapered cups with their bottoms downward; a pivoted member swingable horizontally crosswise of the bottom of the magazine to normally support the stack of cups; wedge means operative incident to retraction of the pivoted member, to engage between the top rims of the lowermost cup and the immediately superjacent cup in the stack, thereby to temporarily sustain the stack with attendant dislodgment of the lowermost cup for release to drop from the magazine; means to reciprocate the slide; and a projection on the slide operative upon an arm extending from the fulcrum axis of the pivoted member to impart swinging movement to the latter.

6. In cup dispensing mechanism, a magazine accommodating a stack of inter-engaged, tapered cups with their bottoms downward; a member movable across the bottom of the magazine to normally support the stack of cups; an independently-movable means to sustain the stack incident to retraction of the aforesaid member and release of the lowermost cup to drop from the magazine; and a direct connection whereby the stack supporting member is actuated by the aforesaid means.

BLANCHE M. GEYER,
*Executrix of the Estate of John F. Geyer, Deceased.*